H. B. RICH.
REVERSIBLE TWINE HOLDER.
APPLICATION FILED OCT. 29, 1913.
1,108,622.
Patented Aug. 25, 1914.
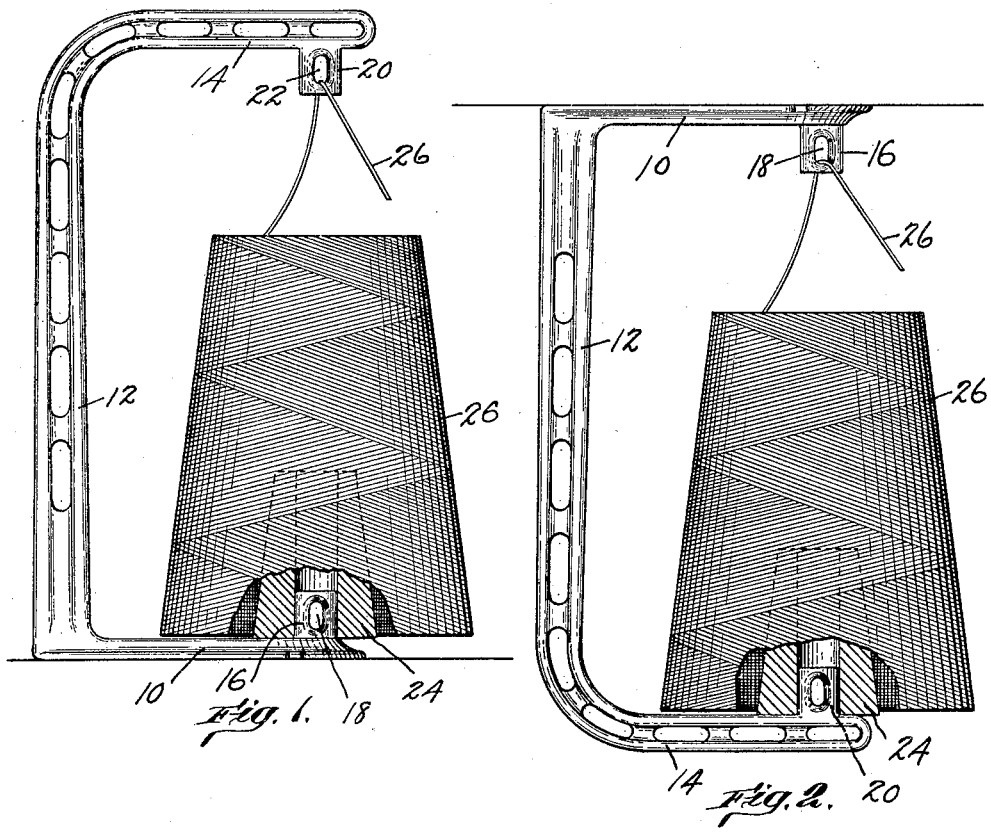
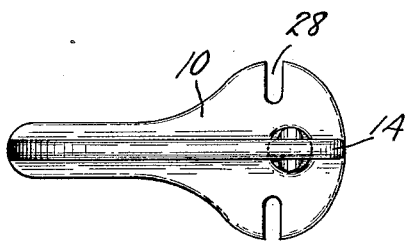
Fig. 3.
Witnesses:
Inventor:
Homer B. Rich

UNITED STATES PATENT OFFICE.

HOMER B. RICH, OF CAMBRIDGE, MASSACHUSETTS, ASSIGNOR TO WRIGHT CUTTER COMPANY, OF BOSTON, MASSACHUSETTS, A CORPORATION OF MASSACHUSETTS.

REVERSIBLE TWINE-HOLDER.

1,108,622.  Specification of Letters Patent.  Patented Aug. 25, 1914.

Application filed October 29, 1913. Serial No. 798,124.

*To all whom it may concern:*

Be it known that I, HOMER B. RICH, of Cambridge, in the county of Middlesex and State of Massachusetts, have invented certain new and useful Improvements in Reversible Twine-Holders, of which the following is a specification.

This invention relates to an improvement in twine holders and has for its object the provision of a strong and simple reversible device which is adapted to hold a mass of twine supported upon a counter or other support, or suspended from overhead.

Heretofore various devices have been made which have provision for securing the cone of twine to the holder so that the latter may be mounted in any desired position. But these devices are comparatively expensive to manufacture, and when suspended from overhead the cone is held inverted with its small end lowermost.

Accordingly, the primary object of the invention is to provide a simple device, which can be manufactured cheaply, which is reversible, and one wherein the cone of twine is always held upright with its small end uppermost.

With the above object in view, the invention contemplates the provision of a holder provided with a pair of members either of which may be employed for supporting the mass of twine, and the other employed to guide the twine as it is drawn from said mass.

The invention will be readily understood from an inspection of the accompanying drawing, in which—

Figure 1 is a sectional side elevation of the holder mounted upright, with a cone of twine in position thereon, Fig. 2 is a similar view with the holder suspended from overhead, and Fig. 3 is a plan view of the holder alone.

As illustrated in the drawing, the holder comprises an attaching portion in the form of a base 10, having at one end a standard 12, which is provided at its upper end with an overhanging portion or arm 14. The base 10 is provided with a supporting member for the twine, comprising a boss 16 having an aperture or eye 18 formed therein adapted to guide twine, and the arm 14 is provided with a boss 20 which is in substantial axial alinement with the boss 16.

The boss 20 is also provided with thread-guiding eye 22, similar to the eye 18. All of the parts are preferably cast integrally, and the bosses 16 and 20 are substantial duplicates.

As shown, the bosses 16 and 20 are adapted to fit within the conical wooden plug 24, which is commonly employed for holding the cone of twine 26 in position. When it is desired to mount the twine holder upon a counter or other support, the base 10 may be secured to said support by means of screws passing through the slots 28 formed in said base. In this case the parts will be in the position shown in Fig. 1, in which the plug 24 is supported about the boss 16, the cone 26 is held with its small end uppermost, and the twine passes through the eye 22 in the boss 20. When it is desired to suspend the holder from overhead, the base 10 is secured to the overhead support, as shown in Fig. 2. In this case the plug 24 is supported about the boss 20, which now projects upward from the arm 14, the cone 26 is held with its small end uppermost, and the twine passes through the eye 18 in the boss 16. It will thus be seen that the holder is reversible, so that the mass of twine may be mounted above or suspended from underneath any suitable support, and in each instance the cone of twine is held with its small end uppermost so that the twine can be drawn off in the proper manner without possibility of snarling.

Although I have shown a conical mass of twine, it will be understood that the holder is in no wise limited to use with this form of mass, but may be employed with other forms.

What I claim is:—

1. A reversible twine holder, comprising a base and an overhanging arm, each provided with a supporting member adapted to hold a mass of twine, each supporting member having provision for guiding the twine as it is drawn from the mass, said members being oppositely disposed so that when one is employed for supporting the mass the other may be employed for guiding the twine as it is drawn from said mass.

2. A reversible twine holder, comprising an attaching portion and a portion substantially parallel thereto, each portion being provided with a boss, said bosses being in substantially axial alinement and each having a twine-guiding aperture, whereby when said holder is secured in position one boss is adapted to support a mass of twine and the other boss is in position to guide the twine as it is drawn from the mass.

In testimony whereof I have affixed my signature, in presence of two witnesses.

HOMER B. RICH.

Witnesses:
GEORGE CLARENDON HODGES,
FREDERIC R. STUMPH.